Nov. 24, 1964

G. E. NELSON 3,157,999

FLUID COUPLING

Filed Sept. 5, 1962

INVENTOR.
Gilbert E. Nelson
BY
Harness, Dickey & Pierce
ATTORNEYS

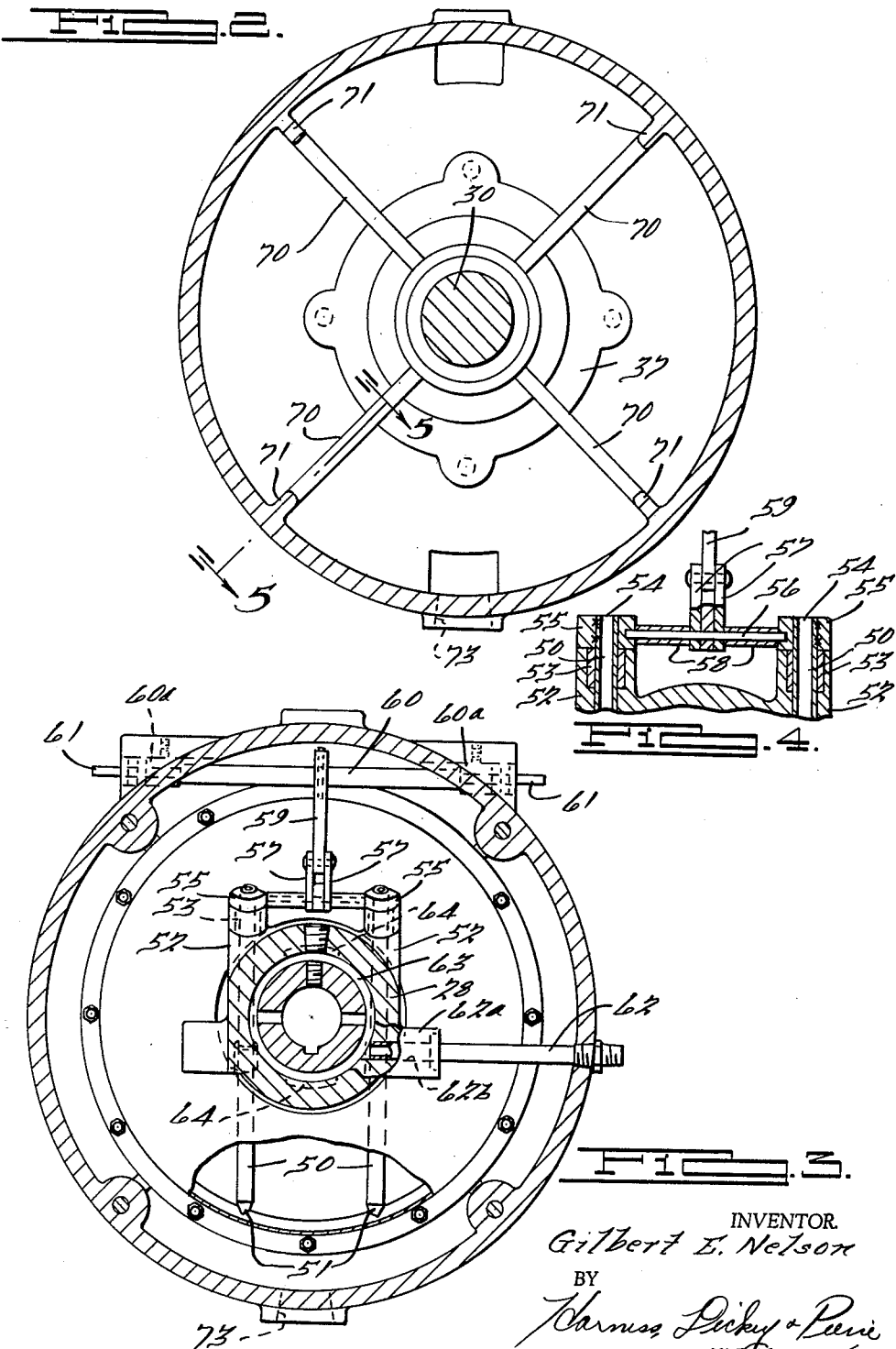

United States Patent Office 3,157,999
Patented Nov. 24, 1964

3,157,999
FLUID COUPLING
Gilbert E. Nelson, Holly, Mich., assignor to Liquid Drive Corporation, Holly, Mich., a corporation of Michigan
Filed Sept. 5, 1962, Ser. No. 221,607
5 Claims. (Cl. 60—54)

This invention relates to hydraulic or hydrokinetic couplings and, more particularly, to a coupling of this type provided with means for minimizing the agitation or swirling action of the liquid in the device.

In a coupling having a flow-through type of drive, when the flow of liquid through the coupling is relatively high, the impeller and casings, which are always rotating at input speed, cause an agitation and swirling of the liquid in the housing. This results in a disturbance of the liquid sufficient to substantially reduce the flow of liquid out of the drain, thereby causing flooding in the housing of the coupling. This flooding produces an overload on the driving motor and prevents proper control of the coupling.

It is therefore a principal object of this invention to provide means for substantially eliminating or minimizing this agitation or swirling action of the liquid in the coupling thereby providing for a smooth, controllable operation of the coupling under all conditions.

This object of the invention is achieved by the provision of rib-like baffles on the interior of the housing of the coupling which intercept and substantially stop the swirling motion of the liquid and reduce the disturbance of the flow thereby permitting the liquid to flow out of the drain at a rate adequate to prevent flooding.

In one form of the invention, these ribs are connected to or are formed integrally with an end wall of the coupling housing and project perpendicularly therefrom toward the interior of the housing. The ribs are spaced circumferentially and extend radially from adjacent the center of this end wall to the outer wall of the housing. If desirable or expedient, these radial ribs may be supplemented by and preferably connected to additional longitudinally extending ribs carried by the outer wall of the housing. Openings are provided in the ribs adjacent the end wall to prevent entrapment of the liquid between the ribs and to permit the liquid to flow freely to the drain. These openings are especially important when the coupling is mounted and operated in an angled or vertical position.

A fluid coupling of the type described herein can be mounted and operated in either a horizontal, angled, or vertical position. In the accompanying drawings, it is shown in a horizontal position. Either the leak-off or the scoop-tube principle of liquid control can be utilized, the latter type being shown in the drawings. The coupling can utilize any suitable liquid, including water. The coupling can be used as a recirculating type of drive by installing a circulating pump or without the pump it can be used as a flow-through type of drive, especially when water is used as the liquid. In the accompanying drawings, the flow-through type of coupling is illustrated.

Further objects of this invention are to provide a construction for the described purpose which is so reduced in the number and character of its component parts as to approach the ultimate in structural simplicity and wherein this structural simplicity creates a substantial economy in its manufacturing, installation and maintenance costs.

The various objects and advantages, and the novel details of construction of one commercially practical embodiment of the invention, shown in conjunction with one type of fluid coupling, will become more apparent as this description proceeds, especially when considered in connection with the accompanying drawings, in which:

FIGURE 2 is a transverse sectional view taken substantially on the plane indicated by line 2—2 in FIGURE 1;

FIGURE 3 is a transverse sectional view taken substantially on the plane indicated by line 3—3 in FIGURE 1;

FIGURE 4 is a fragmentary detail sectional view taken substantially on the plane indicated by line 4—4 in FIGURE 1.

While the invention of this application may be used with equal facility with various types of fluid couplings, one commercially practical type is shown for the purpose of illustrating the invention.

The general type of fluid coupling illustrated is shown in the patent to Snow, No. 2,841,959, dated July 8, 1958, owned by the applicant named in this application.

Figure 1:
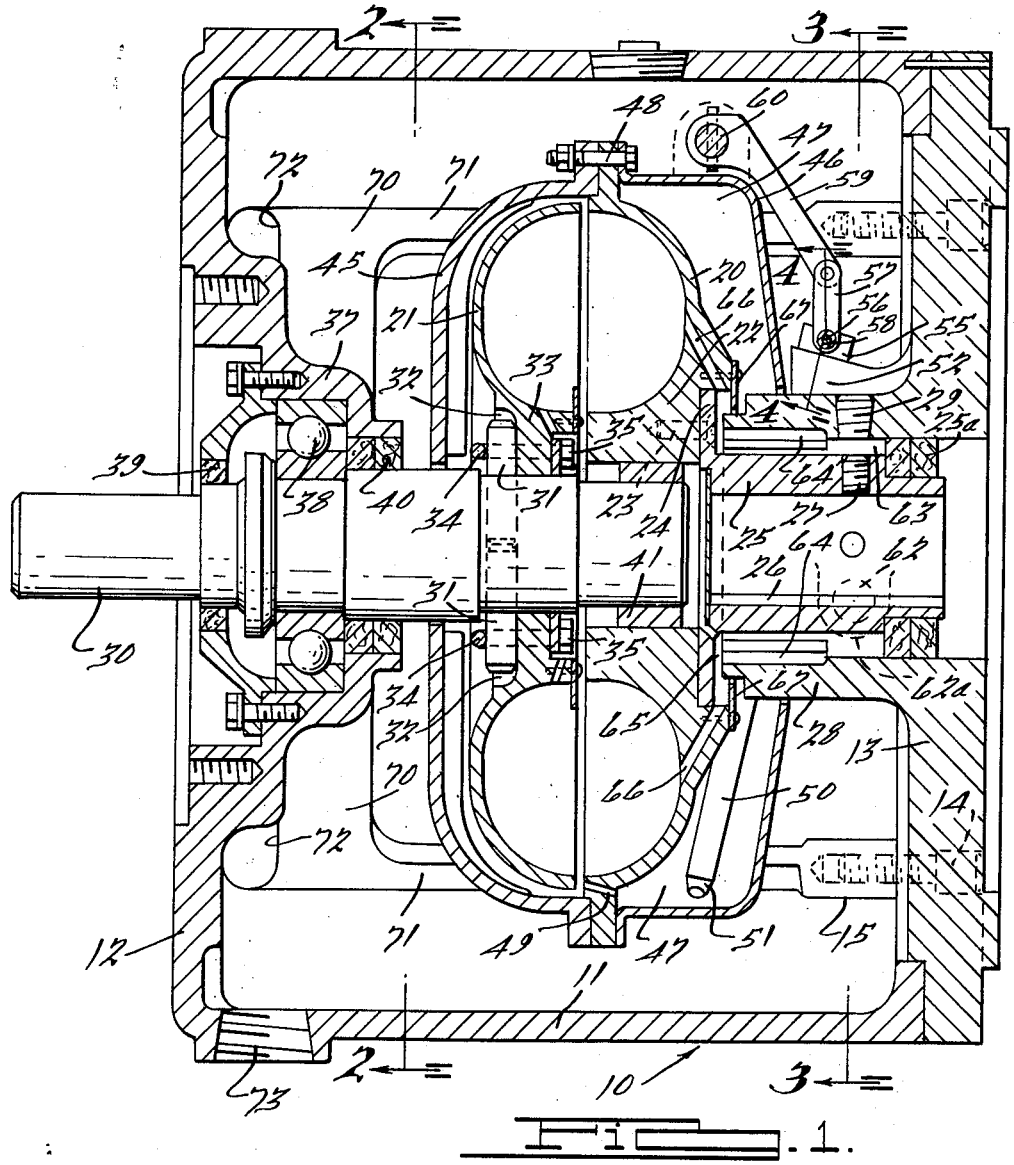
FIGURE 1 is a central longitudinal sectional view through a fluid coupling embodying the present invention.
Figure 5:
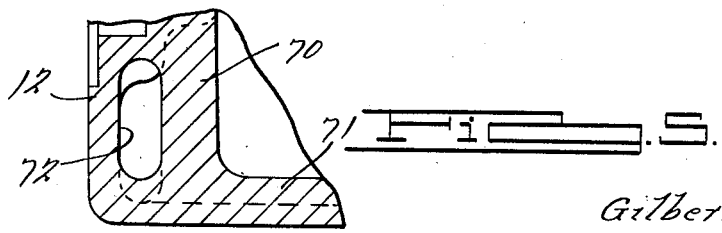
FIGURE 5 is a detail sectional view taken substantially on the plane indicated by line 5—5 in FIGURE 2.

As shown in FIGURE 1 of the drawings, the casing 10 of the device comprises an annular casing 10 having an outer wall 11 and an integral end wall 12. The other end of the casing is closed by an end plate 13 which is secured in place by cap screws 14 threaded into bosses 15 formed on the outer wall 11.

The fluid coupling is of substantially conventional construction and comprises an impeller or pump 20 and a runner or turbine 21. The impeller is provided with a hub portion 22 which is secured by fastening elements 23 to an annular flange 24 formed on the driving hub 25. The hub 25 is secured to the drive shaft of a driving motor (not shown). The hub 25 may be secured to the drive shaft in any suitable manner, but the hub is shown as being provided with a keyway 26 and one or more set screws 27. The hub 25 extends through an annular flange or sleeve 28 extending inwardly from the end plate 13, and suitable or conventional sealing means 25a is provided between the hub 25 and the flange 28. The flange or sleeve 28 may be provided with removable plugs 29 so that access may be had to the set screws 27.

The runner or turbine 21 is carried by and secured to a driven shaft 30 by means of pins 31 which extend into the shaft 30 and into recesses 32 formed in the hub 33 of the runner 21. The pins are held in locked position by means of U-bolts 34 which straddle the pins 31, extend through the hub 33, and are secured in place by nuts 35.

Extending inwardly from the end wall 12 is an annular neck portion 37 which contains an antifriction bearing 38 for the shaft 30 and is also provided with any suitable or conventional type of outer and inner sealing members 39 and 40.

The inner end of the driven shaft 30 is journaled in a bearing 41 mounted in the hub 22 of the impeller 20. While the bearing 41 may be of any suitable type, it is preferably formed of tungsten carbide particularly when water is used as the fluid means.

The impeller 20 carries a rotary casing structure which comprises a rotary casing portion 45 which closely envelops and projects inwardly around the runner 21 and extends to a position close to, but spaced from, the driven shaft 30, and a rotary casing wall 46 which extends from the impeller 20 at a distance therefrom to define a rotary chamber 47. The casing portions 45 and 46 are secured to the impeller by bolts 48. The chamber 47 communicates with the working circuit by means of apertures 49 arranged near the periphery of the impeller. The amount of fluid in the chamber 47, and accordingly in the working circuit, is controllable by means of scoop tubes 50.

In the embodiment illustrated, a pair of scoop tubes 50 are illustrated having their scoop ends 51 facing in opposite directions so that the fluid coupling may be opposite directions so that the fluid coupling may be operated either in the forward or reverse direction. The scoop tubes 50 (see FIGURES 3 and 4) are slidably mounted in bosses 52 formed on the flange or sleeve 28. The upper ends of the scoop tubes 50 extend through bushings 53 carried by the bosses 52 and are open at their upper ends, as indicated at 54. A collar 55 is secured to the open end of each scoop tube and the two collars are connected by a shaft or rod 56 which is pivotally connected to a pair of links 57 located on the rod 56 by means of spacer sleeves 58. The links 57 are connected to an actuating arm 59 which has its upper end fixed to a shaft 60 journaled as at 60a in the outer wall of the casing. The ends 61 of this shaft extend outside the casing so that the shaft 60 may be rocked, and, through the arm 59 and links 57 can raise and lower the scoop tubes 50 to control the level of fluid in the chamber 47 in the conventional manner.

Fluid is supplied to the device through an inlet conduit 62 connected to a boss 62a having a passageway 62b which communicates with an annular passageway 63 located between the hub 25 and the flange or sleeve 28, and the liquid flows from this annular passageway through a plurality of longitudinally extending channels 64 to the space 65 between the flange 24 and the end of the flange 28 from whence it flows through passages 66 to the working circuit of the impeller 20. The space 65 is in part defined by an annular plate 67 secured to the impeller 20.

In a coupling, particularly of the flow-through type, when the flow of liquid through the coupling is relatively high, the impeller 20 and casings 45 and 46, which are always rotating at input speed, cause an agitation and swirling of the liquid in the casing of the coupling. This results in a disturbance of the liquid sufficient to substantially reduce the flow of liquid out of the drain, thereby causing flooding in the casing of the coupling. This flooding produces an overload on the driving motor and prevents proper control of the coupling. In accordance with this invention, means is provided for substantially eliminating or minimizing this agitation or swirling action of the liquid in the coupling, thereby providing a smooth, controllable operation of the coupling under all conditions.

In accordance with this invention, there are provided a plurality of ribs 70 which may be connected to, but which are preferably formed integrally with, the end wall 12 of the casing and project perpendicularly therefrom toward the interior of the housing. While any number of these ribs may be employed, four have been illustrated. The ribs 70 are spaced circumferentially and extend radially from the neck portion 37 to the outer wall 11 of the casing. These radial ribs may be supplemented by and preferably are connected to additional longitudinally extending ribs 71 carried by the outer wall 11 of the housing. Each of the ribs 70 is provided, adjacent the end wall 12, with an opening 72 to prevent entrapment of the liquid between the ribs and to permit the liquid to flow freely to a drain 73 formed in the housing. These openings are particularly important when the coupling is mounted and operated in an angled or vertical position. The bosses 15, previously referred to, may conveniently be formed at the end of each of the ribs 71.

With the construction just described, the swirling motion of the liquid in the casing is intercepted and substantially stopped thereby reducing the disturbance of the liquid to permit it to flow out the drain at a rate adequate to prevent flooding. With the agitation or swirling action in the coupling substantialy eliminated or minimized, a smooth, controllable operation of the coupling under all conditions is assured.

While the fluid coupling herein described has been shown in a horizontal position, it can be mounted or operated in either a horizontal, angled or vertical position. The scoop-tube principle of liquid control has been shown in the drawings, but the invention is not limited to this particular type of liquid control. The invention may be used with equal facility in a coupling having a recirculating type of drive. In the drawings the invention is shown in association with a coupling havnig a flow-through type of drive which is especially efficient when water is used as the liquid.

While one commercially practical embodiment of the invention has been described and illustrated herein somewhat in detail, it will be understood that various changes may be made as may come within the purview of the accompanying claims.

What is claimed is:

1. In a flow-through type of fluid coupling comprising a stationary housing, an impeller and casing in said housing rotating at input speed, and a drain opening in the housing for the fluid located adjacent one corner of the housing, and wherein said rotating parts cause a swirling of the fluid resulting in a disturbance thereof sufficient to substantially reduce the flow of fluid out of the drain, that improvement which comprises, a plurality of circumferentially spaced, radially extending baffle members carried by the inner face of an end wall of said housing, and a plurality of longitudinally extending baffle members carried by the outer wall of said housing, said baffle members projecting into the path of the fluid on opposite sides of said drain to substantially arrest the swirling motion of the fluid to permit the fluid to flow out the drain at a rate adequate to prevent flooding of the coupling.

2. In a flow-through type of fluid coupling comprising a stationary housing, an impeller and casing in said housing rotating at input speed, and a drain opening in the housing for the fluid, and wherein said rotating parts cause a swirling of the fluid resulting in a disturbance thereof sufficient to substantially reduce the flow of fluid out of the drain, that improvement which comprises, a plurality of circumferentially spaced, radially extending baffle members carried by the inner face of an end wall of said housing, and a plurality of longitudinally extending baffle members carried by the outer wall of said housing, said baffle members projecting into the path of the fluid on opposite sides of said drain to substantially arrest the swirling motion of the fluid to permit the fluid to flow out the drain at a rate adequate to prevent flooding of the coupling.

3. A fluid coupling as described in claim 2 in which the first mentioned baffle members are formed integrally with the inner face of said end wall of the housing.

4. A fluid coupling as described in claim 2 in which openings are provided in the baffle members adjacent said end wall to prevent entrapment of the fluid between the baffle members.

5. A fluid coupling as described in claim 2 in which the baffle members on the end wall and on the outer wall are in the form of ribs integral with said walls and said ribs on the outer wall are in alignment with the ribs on said end wall.

References Cited in the file of this patent

UNITED STATES PATENTS

| 2,182,049 | Henry | Dec. 5, 1939 |
| 2,190,830 | Dodge | Feb. 20, 1940 |
| 2,649,689 | Oding | Aug. 25, 1953 |
| 2,784,555 | Anderson | Mar. 12, 1957 |
| 2,841,959 | Snow | July 8, 1958 |
| 3,045,430 | Becker | July 24, 1962 |

FOREIGN PATENTS

| 693,003 | Great Britain | June 17, 1953 |